(12) United States Patent
Bryfogle

(10) Patent No.: US 8,390,137 B2
(45) Date of Patent: Mar. 5, 2013

(54) FLUID-DRIVEN ELECTRICAL GENERATOR

(76) Inventor: Mark Bryfogle, Silver Spring, MD (US)

( * ) Notice: Subject to any disclaimer, the term of this patent is extended or adjusted under 35 U.S.C. 154(b) by 341 days.

(21) Appl. No.: 12/894,996

(22) Filed: Sep. 30, 2010

(65) Prior Publication Data

US 2011/0080005 A1 Apr. 7, 2011

Related U.S. Application Data

(60) Provisional application No. 61/272,515, filed on Oct. 1, 2009.

(51) Int. Cl.
*H02K 35/00* (2006.01)
*F03G 7/00* (2006.01)
(52) U.S. Cl. .......................... 290/1 R; 310/36
(58) Field of Classification Search .................. 290/1 R
See application file for complete search history.

(56) References Cited

U.S. PATENT DOCUMENTS

| | | | |
|---|---|---|---|
| 4,500,827 A | 2/1985 | Merritt et al. | |
| 5,839,508 A * | 11/1998 | Tubel et al. | 166/65.1 |
| 5,912,520 A | 6/1999 | Kobayashi et al. | |
| 6,276,313 B1 * | 8/2001 | Yang et al. | 123/46 E |
| 6,750,596 B2 * | 6/2004 | Kim et al. | 310/339 |
| 6,876,094 B2 | 4/2005 | Jacobsen | |
| 7,498,681 B1 * | 3/2009 | Kellogg et al. | 290/1 R |
| 7,573,143 B2 * | 8/2009 | Frayne | 290/1 R |
| 7,948,124 B1 * | 5/2011 | Waters et al. | 310/36 |
| 2006/0119224 A1 | 6/2006 | Keolian et al. | |
| 2007/0231944 A1 * | 10/2007 | Kvisteroy | 438/52 |
| 2008/0129254 A1 | 6/2008 | Frayne | |
| 2008/0296984 A1 * | 12/2008 | Honma et al. | 310/17 |
| 2010/0109450 A1 * | 5/2010 | Unger | 310/30 |
| 2011/0025149 A1 * | 2/2011 | Kim et al. | 310/81 |

OTHER PUBLICATIONS

Waves of Power, one Internet page Jul. 9, 2009 http://www.physorg.com/print4142.html.

* cited by examiner

*Primary Examiner* — Joseph Waks
(74) *Attorney, Agent, or Firm* — Richard C. Litman

(57) ABSTRACT

The fluid-driven electrical generator utilizes internal driven fluid currents to generate a regular, mechanical oscillation that is used to generate electricity through electromagnetic induction. The fluid-driven electrical generator includes a base having opposed upper and lower surfaces. A linearly oscillating disc having opposed upper and lower surfaces and having a central passage formed therethrough is resiliently supported above the base to form a lower fluid flow path therebetween. An upper housing is mounted above the upper surface of the linearly oscillating disc. A lower surface of an upper wall thereof is spaced apart from the upper surface of the linearly oscillating disc to form an upper fluid flow path therebetween. At least one permanent magnet is attached to an outer edge of the linearly oscillating disc for generating alternating electrical current in at least one induction coil mounted adjacent the at least one permanent magnet.

15 Claims, 2 Drawing Sheets

FLUID-DRIVEN ELECTRICAL GENERATOR

CROSS-REFERENCE TO RELATED APPLICATION

This application claims the benefit of U.S. Provisional Patent Application Ser. No. 61/272,515, filed Oct. 1, 2009.

BACKGROUND OF THE INVENTION

1. Field of the Invention

The present invention relates to electrical generators. More particularly, the present invention relates to a fluid-driven electrical generator utilizing internal driven fluid currents to generate a regular oscillation that generates electricity through electromagnetic induction or the like.

2. Description of the Related Art

Due to the limitations of non-renewable energy sources, such as oil and coal, as well as the negative environmental effects of such energy sources, it is desirable to provide efficient and enhanced energy conversion and transfer systems which are convenient and inexpensive to operate for the end-user. Converting the kinetic energy present in flowing fluids, such as wind or water, into usable mechanical or electrical energy is well known in the art. Wind-powered generators typically harness these fluid flows for the production of electricity. Wind-powered generators, and similar technologies, typically utilize a turbine or a rotating airfoil. While these turbine-based wind generators are generally useful in certain open spaces with consistently high-speed winds, drawbacks still exist, such as heavy initial capital costs, low efficiency at all but a narrow range of wind speeds, the lack of cost effectiveness at lower power outputs levels (i.e., less than one kW), and inefficiency in trying to scale down the power output for a typical single family home. Water wheels, wave-driven energy generators and other fluid-based systems suffer from the same drawbacks.

Smaller scale fluid-based generators and power converters are also known in the art, such as home water wheels, small wind generators and the like, and generally include hydraulic or pneumatic systems for converting initially input mechanical energy into energy for driving an external system. Though such systems are typically sealed, fluid pressure must either be constantly regulated or varied throughout the operation of the system, thus requiring a large amount of energy input to sustain the system, which decreases the efficiency of the system in terms of net energy usage. Further, such systems typically require the fluid or fluids to be transferred from one chamber to the next, which causes great loss of energy in fluid resistance, friction and in the energy required to transfer the fluid.

Thus, a fluid-driven electrical generator solving the aforementioned problems is desired.

SUMMARY OF THE INVENTION

The fluid-driven electrical generator utilizes internal driven fluid currents to generate a regular, mechanical oscillation that is used to generate electricity through electromagnetic induction or the like. The fluid-driven electrical generator includes a base having opposed upper and lower surfaces. The lower surface thereof is adapted for positioning on a support surface, such as the floor. A linearly oscillating disc, having opposed upper and lower surfaces and having a central passage formed therethrough, is further provided. The linearly oscillating disc is elastically supported above the base to form a lower fluid flow path therebetween.

An upper housing is mounted above the upper surface of the linearly oscillating disc. The upper housing includes at least one sidewall and an upper wall. At least one fluid inlet is formed through the at least one sidewall and a lower surface of the upper wall is spaced apart from the upper surface of the linearly oscillating disc so as to form an upper fluid flow path therebetween. A compressor, blower, pump or the like may be mounted within the upper housing to draw ambient fluid through the at least one inlet, through the upper fluid flow path and through the lower fluid flow path. In the preferred embodiment, the upper fluid flow path formed through the upper housing serves as the compressor itself.

At least one permanent magnet is secured to an outer edge of the linearly oscillating disc. At least one induction coil is mounted adjacent the at least one permanent magnet. The lower surface of the upper wall of the upper housing and at least a portion of the upper surface of the linearly oscillating disc are contoured such that fluid flow through the upper flow path causes linearly oscillating movement of the linearly oscillating disc to generate electricity in the at least one coil. Alternatively, the upper surface of the base and at least a portion of the lower surface of the linearly oscillating disc may be contoured such that fluid flow through the lower flow path causes the linearly oscillating movement of the linearly oscillating disc. In the preferred embodiment, the upper surface of the base, the lower surface of the linearly oscillating disc, the upper surface of the linearly oscillating disc and the lower surface of the upper wall are all contoured so as to impart oscillatory movement to the linearly oscillating disc.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
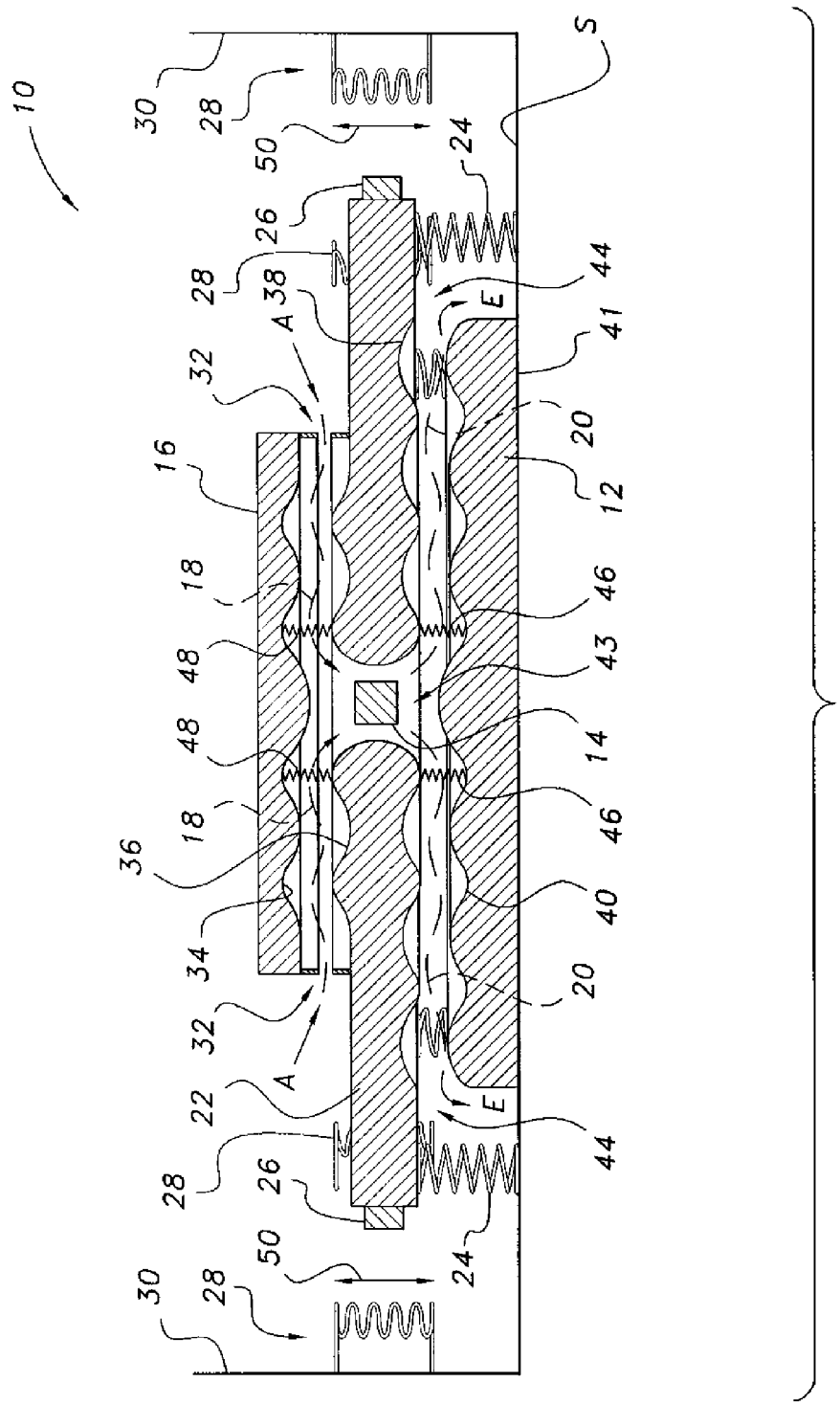
FIG. 1 is a diagrammatic section view of a fluid-driven electrical generator according to the present invention.
Figure 2:
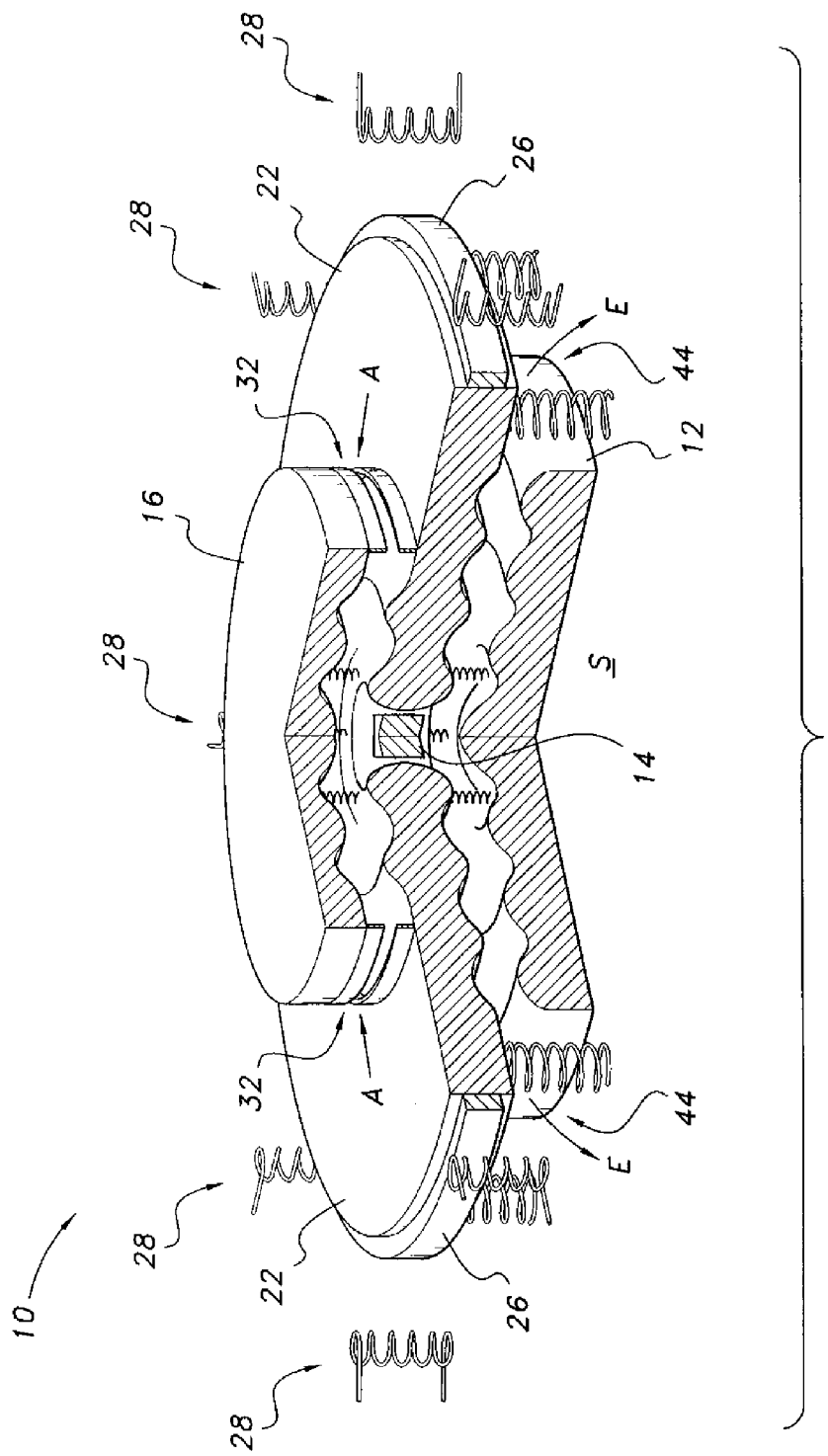
FIG. 2 is a perspective view of the fluid-driven electrical generator according to the present invention, broken away and partially in section to show details thereof.

Referring to FIGS. 1 and 2, the fluid-driven electrical generator 10 includes a base 12 having opposed upper and lower surfaces 40, 41, respectively. The lower surface 41 is adapted for positioning on a support surface S, such as the floor. A pivotally constrained disc 22 oscillating along its axial center, having opposed upper and lower surfaces 36, 38, respectively, and further having a central passage 43 formed therethrough, is further provided. The linearly oscillating disc 22 is elastically supported above the base 12 to form a lower fluid flow path therebetween (shown by directional arrows 20 in FIG. 1, with the designation E indicating exhaust fluid being expelled from outlets 44).

An upper housing 16 is mounted above the upper surface 36 of the linearly oscillating disc 22. The upper housing 16 includes at least one sidewall and an upper wall. At least one fluid inlet 32 is formed through the at least one sidewall of upper housing 16. A lower surface 34 of the upper wall of housing 16 is spaced apart from the upper surface 36 of the linearly oscillating disc 22 so as to form an upper fluid flow path therebetween (as indicated by arrows 18 in FIG. 1, with the designation A representing ambient fluid entering the inlets 32). A compressor, blower, pump or the like may be mounted within the upper housing 16 to draw ambient fluid through the at least one inlet 32, through the upper fluid flow path 18, down through the central passage 43, and through the lower fluid flow path 20 to be expelled as exhaust through outlets 44. In the preferred embodiment, however, the upper fluid flow path 18, defined within the upper housing 16, serves as the compressor itself, thus not requiring an additional source of fluid power. Moreover, the fluid may be ignited in a controlled manner to provide more kinetic energy in the oscillating disc. For example, the fluid may be gaseous (e.g., natural gas), kerosene, ethanol, or the like. Thermal cycle of fluid combustion may be conducted in such a manner as to cause the fluid-driven electrical generator 10 to operate as a Brayton cycle heat engine, which is well known to ordinary skilled artisans. When the fluid-driven electrical generator 10 operates in the aforementioned Brayton engine mode, waste heat energy can be recovered and added to the electrical generating capacity to provide cogeneration or combined heat and power (CHP) for domestic or industrial use.

As best shown in FIG. 2, the upper housing 16, the linearly oscillating disc 22 and the base 12 each preferably have a substantially cylindrical outer contour. It should be understood that the upper housing 16, the linearly oscillating disc 22 and the base 12 may have any suitable contouring or relative dimensions. Additionally, a heater or burner 14, such as a natural gas burner or the like, is preferably received within the central passage 43 so as to heat the ambient air as it flows from the upper flow path 18, through central passage 43, and out through the lower flow path 20. It should be understood that any suitable type of heater may be used to increase the temperature of the airflow along this path. Additionally, the positioning of heater 14 may be varied and is only shown in FIG. 1 for exemplary purposes only. For example, a plurality of small burners may be positioned along upper flow path 18. It should be understood that any suitable type of heater or burner 14 may be utilized, and the positioning thereof, or the configuration thereof, is dependent upon the particular contouring of the upper and lower fluid flow paths, which may be varied, as will be described in greater detail below.

At least one permanent magnet 26 is secured to an outer edge of the linearly oscillating disc 22. It should be understood that any suitable type of magnet or magnetic material may be utilized. Additionally, any suitable number of magnets may be used. For example, a single ring magnet may be secured circumferentially to the linearly oscillating disc, or a plurality of magnets may be secured to the outer edge thereof at regular intervals.

At least one induction coil 28 is mounted adjacent the at least one permanent magnet 26. The induction coil 28 may be supported on a support 30, which may be a wall surrounding the linearly oscillating disc 22, or may be a separate support or mount. As noted above, the linearly oscillating disc 22 is elastically supported above base 12. At least one spring 46 or other elastic element is provided for supporting the linearly oscillating disc 22 above base 12 to define the lower fluid flow path 20. Additional springs 24 may be provided, external to base 12, to provide additional support. The springs 24, 46 allow the linearly oscillating disc 22 to move in the vertical direction in an oscillatory manner with respect to the base 12. Additionally, further elastic elements 48 may be provided, securing and spacing apart the upper surface 36 of the linearly oscillating disc 22 and the lower surface 34 of the upper wall of housing 16.

As best shown in FIG. 1, the lower surface 34 of the upper wall of the upper housing 16 and at least a portion of the upper surface 36 of the linearly oscillating disc 22 are contoured such that fluid flow through the upper flow path 18 receives (in the manner of a compressor) energy from the linearly oscillating movement of the lineally oscillating disc 22 (indicated by arrows 50). The vertical oscillating movement of disc 22 causes vertical oscillating movement of the at least one magnet 26, which drives generation of alternating current in the least one induction coil 28, as is well-known, due to Faraday's law of induction. Correspondingly, the upper surface 40 of the base 12 and at least a portion of the lower surface 38 of the linearly oscillating disc 22 may be contoured such that fluid flow through the lower flow path 20 imparts (in the manner of an expansion engine) energy to the linearly oscillating movement of the linearly oscillating disc 22. In the preferred embodiment, the upper surface 40 of the base 12, the lower surface 36 of the linearly oscillating disc 22, the upper surface 36 of the linearly oscillating disc 22 and the lower surface 34 of the upper wall of housing 16 are all contoured conjointly so as to impart oscillatory movement to the linearly oscillating disc 22, as shown in FIGS. 1 and 2.

In the exemplary embodiment of FIGS. 1 and 2, electrical current is generated in coils 28 by Faraday's law of induction, as is well known. It should be understood that the combination of the magnet or magnets 26 with coils 28 may be replaced by any suitable type of electrical generator subsystem, which is dependent upon regular oscillatory motion. For example, a mechanical linkage may be provided to directly drive the vertical, oscillating motion into electrical energy through a conventional electrical generator. Alternatively, a horizontal magnetic field could be generated by an external magnetic field source (replacing the coils 28 with one or more electromagnets, for example), and with the magnet or magnets 26 being replaced by an annular conductor, such as a copper ring. Similar to an induction motor, the electrical current would be generated within the annular conductor, also using Faraday's law of induction, but with the orientation between conductive ring and magnetic field generator being reversed.

In the preferred embodiment, the contouring of the upper surface 40 of the base 12, the lower surface 38 of the linearly oscillating disc 22, the upper surface 36 of the linearly oscillating disc 22 and the lower surface 34 of the upper wall of housing 16 are all substantially sinusoidal or undulating. It should be understood that any suitable contouring may be selected to impart regular oscillating motion to disc 22, such as a substantially V-shaped contouring, a hyperbolic contouring, a parabolic contouring, or any other desired contouring.

Additionally, it should be understood that the overall contouring of the housings may be varied. For example, substantially flattened housings may be utilized, rather than the cylindrical sections shown in FIGS. 1 and 2. Further, the number of housings may be varied. For example, a system with an upper and lower housing may be provided, without the central oscillating ring. The upper housing would be elastically biased with respect to the lower housing and would oscillate with respect thereto. As a further alternative, both the upper and lower housings may oscillate with respect to the external support surface, such that the overall center of mass of the system remains static. In the two-housing alternative, a single airflow passage would be defined therebetween, with exhaust moving downwardly through the center of the system, and through a central passage defined through the lower housing. The overall contouring of the airflow passage may have any desired contouring, such as a downward parabolic or hyperbolic contour, leading to the exhaust port.

In FIG. 1, the system 10 is shown diagrammatically in section. It should be understood that the upper and lower flow paths 18, 20 preferably extend annularly. Additionally, it should be understood that the sinusoidal contouring of the airflow passages is shown for exemplary purposes only. As a further alternative, the height of the peaks and valleys, as well as the spacing therebetween, may be variable, rather than the regular, sinusoidal contour illustrated.

Additionally, airflow regulators, valves or the like may be provided in communication with the compressor the like. The rate and volume of air A being input through inlet 32, the temperature of the air heated by heater 14, the rate and volume of exhaust E being expelled through outlets 44, and the contouring of flow paths 18, 20 are all selected and adjusted so as to cause a regular oscillation of disc 22. Preferably, disc 22 oscillates at a frequency of 60 Hz, allowing the electricity generated by induction coils 28 to be used in addition to, or in place of, the standard household electrical power supply, which delivers AC current with a frequency of 60 Hz in the United States. The overall mass and contouring of system 10 may also be adjusted to achieve the desired oscillatory frequency of disc 22, as well as the spring constants of elastic elements 24, 46, 48.

As a further alternative, the magnet 26 and induction coil 28 may be removed, with any other suitable type of generator or mechanical linkage being secured to disc 22, with the oscillatory movement of disc 22 driving the generator.

It is to be understood that the present invention is not limited to the embodiments described above, but encompasses any and all embodiments within the scope of the following claims.

I claim:

1. A fluid-driven electrical generator, comprising:
  a base having opposed upper and lower surfaces, the lower surface being adapted for positioning on a support surface;
  a linearly oscillating disc having opposed upper and lower surfaces and having a central passage formed therethrough, the linearly oscillating disc being resiliently supported above the base to form a lower fluid flow path therebetween;
  an upper housing mounted above the upper surface of the linearly oscillating disc, the upper housing having at least one sidewall, an upper wall, and at least one fluid inlet formed through the at least one sidewall, the upper wall having a lower surface spaced apart from the upper surface of the linearly oscillating disc to form an upper fluid flow path therebetween;
  means for drawing ambient fluid through the at least one inlet, through the upper fluid flow path, and through the lower fluid flow path;
  at least one permanent magnet secured to an outer edge of the linearly oscillating disc; and
  at least one induction coil mounted adjacent the at least one permanent magnet, the lower surface of the upper wall of the upper housing and at least a portion of the upper surface of the linearly oscillating disc being configured so that fluid flow through the upper flow path causes linearly oscillating movement of the linearly oscillating disc to generate electricity by electromagnetic induction.

2. The fluid-driven electrical generator as recited in claim 1, further comprising means for heating the ambient fluid.

3. The fluid-driven electrical generator as recited in claim 1, wherein the lower surface of the upper wall of said upper housing and the portion of the upper surface of said linearly oscillating disc are each substantially sinusoidal.

4. The fluid-driven electrical generator as recited in claim 1, further comprising at least one spring, said oscillating disc being resiliently supported by the at least one spring, said oscillating disc having a mass and the at least one spring having a spring constant resulting in a resonant frequency of oscillation of said oscillating disc.

5. The fluid-driven electrical generator as recited in claim 4, wherein the resonant frequency of oscillation is approximately 60 Hz.

6. A fluid-driven electrical generator, comprising:
  a base having opposed upper and lower surfaces, the lower surface being adapted for positioning on a support surface;
  a linearly oscillating disc having opposed upper and lower surfaces and having a central passage formed therethrough, the linearly oscillating disc being resiliently supported above the base to form a lower fluid flow path therebetween;
  an upper housing mounted above the upper surface of the linearly oscillating disc, the upper housing having at least one sidewall, an upper wall, and at feast one fluid inlet formed through the at least one sidewall, the upper wall having a lower surface spaced apart from the upper surface of the linearly oscillating disc to form an upper fluid flow path therebetween;
  means for drawing ambient fluid through the at least one inlet, through the upper fluid flow path, and through the lower fluid flow path;
  at least one permanent magnet attached to an outer edge of the linearly oscillating disc; and
  at least one induction coil mounted adjacent the at least one permanent magnet, the upper surface of the base and at least a portion of the lower surface of the linearly oscillating disc being configured so that fluid flow through the lower flow path causes linearly oscillating movement of the linearly oscillating disc to generate electricity by electromagnetic induction.

7. The fluid-driven electrical generator as recited in claim 6, further comprising means for heating the ambient fluid.

8. The fluid-driven electrical generator as recited in claim 6, wherein the upper surface of said base and the portion of the lower surface of said linearly oscillating disc are each substantially sinusoidal.

9. The fluid-driven electrical generator as recited in claim 6, further comprising at least one spring, the spring resiliently supporting said oscillating disc, said disc having a mass and said at least one spring having a spring constant resulting in a resonant frequency of oscillation of said oscillating disc.

10. The fluid-driven electrical generator as recited in claim 9, wherein the resonant frequency of oscillation is approximately 60 Hz.

11. An electrical generator, comprising:
  a base having opposed upper and lower surfaces, the lower surface being adapted for positioning on a support surface;
  a pivotally constrained disc oscillating along its axial center, the disc having opposed upper and lower surfaces and having a central passage formed therethrough, the oscillating disc being resiliently supported above the base to form a lower fluid flow path therebetween;
  an upper housing mounted above the upper surface of the oscillating disc, the upper housing having at least one sidewall, an upper wall, and at least one inlet for accepting combustible fluid, the inlet being formed through the at least one sidewall, the upper wall having a lower surface spaced apart from the upper surface of the oscillating disc to form an upper flow path for the combustible fluid therebetween;

means for drawing the combustible fluid through the at least one inlet, through the upper fluid flow path, and through the lower fluid flow path;

means for combustion of the combustible fluid within the electrical generator;

at least one permanent magnet attached to an outer edge of the oscillating disc; and at least one induction coil mounted adjacent the at least one permanent magnet, the upper surface of the base and at least a portion of the lower surface of the oscillating disc being configured so that combustion of the combustible fluid during fluid flow through the lower flow path causes the oscillatory movement of the disc along the axis of the disk to generate electricity by electromagnetic induction.

12. The fluid-driven electrical generator as recited in claim 11, wherein the lower surface of the upper wall of said upper housing and the portion of the upper surface of said linearly oscillating disc are each substantially sinusoidal.

13. The fluid-driven electrical generator as recited in claim 11, wherein combustion of the combustible fluid within said electrical generator causes said generator to operate as a Brayton thermal cycle heat engine.

14. The fluid-driven electrical generator as recited in claim 11, further comprising at least one spring, said oscillating disc being resiliently supported by the at least one spring, said disc having a mass and said spring having a spring constant resulting in a resonant frequency of oscillation of said oscillating disc.

15. The fluid-driven electrical generator as recited in claim 14, wherein the resonant frequency of oscillation is approximately 60 Hz.

* * * * *